US007762591B2

(12) United States Patent
Schilling et al.

(10) Patent No.: US 7,762,591 B2

(45) Date of Patent: Jul. 27, 2010

(54) SECURITY DOCUMENT

(75) Inventors: Andreas Schilling, Hagendorn (CH); Wayne Robert Tompkin, Baden (CH); John Anthony Peters, Au (CH)

(73) Assignee: OVD Kinegram AG, Zug (CH)

( * ) Notice: Subject to any disclaimer, the term of this patent is extended or adjusted under 35 U.S.C. 154(b) by 0 days.

(21) Appl. No.: 11/662,167

(22) PCT Filed: Sep. 7, 2005

(86) PCT No.: PCT/EP2005/009583

§ 371 (c)(1),
(2), (4) Date: May 21, 2007

(87) PCT Pub. No.: WO2006/029744

PCT Pub. Date: Mar. 23, 2006

(65) Prior Publication Data

US 2008/0067801 A1 Mar. 20, 2008

(30) Foreign Application Priority Data

Sep. 15, 2004 (DE) ...................... 10 2004 044 458

(51) Int. Cl.
*B42D 15/00* (2006.01)
*B42D 15/10* (2006.01)
*G02B 27/10* (2006.01)
*G02B 3/08* (2006.01)

(52) U.S. Cl. .......................... 283/106; 283/72; 283/87; 283/94; 359/619; 359/620; 359/621; 359/742

(58) Field of Classification Search .................. 283/87, 283/72, 94, 106; 359/2, 563, 570, 572, 573, 359/619–621, 742

See application file for complete search history.

(56) References Cited

U.S. PATENT DOCUMENTS 5,284,364 A 2/1994 Jain ............................ 283/87

(Continued)

FOREIGN PATENT DOCUMENTS

DE 197 29 918 A1 1/1999

(Continued)

OTHER PUBLICATIONS

Zientek P., "Polymeric Self-Authenticating Banknotes", Proceedings of the SPIE, vol. 3314, pp. 272-274, Jan. 28, 1998.

(Continued)

*Primary Examiner*—Dana Ross
*Assistant Examiner*—Kyle Grabowski
(74) *Attorney, Agent, or Firm*—Hoffmann & Baron LLP

(57) ABSTRACT

The invention concerns a security document (7) having a first transparent region (72) in which a first transparent optical element (74) is arranged and a second region (71) in which a second opaque optical element (73) is arranged. The second opaque optical element (73) exhibits a first optical effect. The first region (72) and the second region (71) are arranged in mutually spaced relationship on a carrier (75) of the security document, in such a way that the first and second regions can be brought into mutually overlapping relationship. Upon overlap of the second optical element with the first optical element with a first spacing (26) between the first and second optical elements a second optical effect appears and upon overlap of the second optical element with the first optical element with a second spacing (25) between the first and second optical elements, which is greater than the first spacing (26), a third optical effect (51) which is different from the second optical effect appears.

12 Claims, 7 Drawing Sheets

U.S. PATENT DOCUMENTS

| | | | | |
|---|---|---|---|---|
| 5,383,687 | A * | 1/1995 | Suess et al. | 283/86 |
| 5,712,731 | A | 1/1998 | Drinkwater et al. | |
| 5,995,638 | A | 11/1999 | Amidror et al. | 382/100 |
| 6,467,810 | B2 * | 10/2002 | Taylor et al. | 283/72 |
| 6,770,898 | B1 * | 8/2004 | Wilson et al. | 283/72 |
| 7,194,105 | B2 | 3/2007 | Hersch et al. | 382/100 |
| 7,488,002 | B2 * | 2/2009 | Ahlers et al. | 283/72 |
| 2002/0117845 | A1 * | 8/2002 | Ahlers et al. | 283/72 |
| 2003/0015866 | A1 * | 1/2003 | Cioffi et al. | 283/72 |
| 2003/0137145 | A1 * | 7/2003 | Fell et al. | 283/72 |
| 2003/0169468 | A1 * | 9/2003 | Menz et al. | 359/2 |
| 2004/0076310 | A1 | 4/2004 | Hersch et al. | |

FOREIGN PATENT DOCUMENTS

| | | | |
|---|---|---|---|
| DE | 100 40 785 | A1 | 3/2002 |
| EP | 0256176 | | 2/1988 |
| EP | 0930979 | | 7/1999 |
| RU | 1452361 | | 7/1995 |
| SU | 560769 | | 6/1977 |
| WO | WO 98/15418 | | 4/1998 |
| WO | WO 03/101755 | | 12/2003 |
| WO | WO 2004/036507 | A2 | 4/2004 |

OTHER PUBLICATIONS

Coventry L., "Polymer notes and the Meaning of Life", Currency Conference XP 002362310, Apr. 2001.

* cited by examiner

SECURITY DOCUMENT

This application claims priority based on an International Application filed under the Patent Cooperation Treaty, PCT/EP2005/009583, filed on Sep. 7, 2005 and German Application No. 102004044458.7, filed on Sep. 15, 2004.

FIELD OF THE INVENTION

The invention concerns a security document, in particular a banknote or an identity card, having a first region in which a first transparent optical element is arranged and a second region in which a second opaque optical element is arranged. In that case the first region and the second region are arranged on a flexible carrier of the security document in mutually spaced relationship in such a way that the first and second regions can be brought into overlap with each other for example by bending, folding or turning the flexible carrier.

BACKGROUND OF THE INVENTION

Thus EP 0 930 979 B1 discloses a self-checking banknote which comprises a flexible plastic carrier. The flexible plastic carrier comprises a transparent material and is provided with a clouded sheathing which leaves a clear transparent surface free as a window. Now, a magnification lens is arranged in the flexible window, as a self-verification means. Further provided on the banknote is a microprint region which manifests a small character, a small line or a filigree pattern. Now, to check or inspect the banknote, the banknote is folded and thus the transparent window and the microprint region are brought into overlapping relationship. The magnification lens can now be used to make the microprint visible to the viewer and thus verify the banknote. In that case, magnification of the micropattern which is afforded to the viewer is determined by the clear range of vision (in the case of normally sighted persons 25 cm) and by the focal length of the magnification lens. The banknote configuration proposed in EP 0 930 979 B1 therefore provides that a security feature which is arranged concealed in the banknote is clearly shown by means of a verification means disposed on the banknote.

In addition EP 0 256 176 A1 discloses a bank passbook with an encrypted identification carrier which is printed internally on the rear cover of the book or on a page of the book and has means for authenticity verification in the form of a transparent region. The transparent region is configured as a reading screen for decrypting the encrypted identification character as soon as that screen is superposed with the surface including the encrypted identification character by the book cover being closed.

SUMMARY OF THE INVENTION

Now the object of the present invention is to provide an improved security document.

That object is attained by a security document which has a first transparent region in which a first transparent optical element is arranged and a second region in which a second opaque optical element is arranged, which exhibits a first optical effect, wherein the first region and the second region are arranged on a carrier of the security document in mutually spaced relationship in such a way that the first and the second region can be brought into mutually overlapping relationship, and in which upon overlap of the second optical element with the first optical element at a first spacing between the first and the second optical element a second optical effect is produced and upon overlap of the second optical element with the first optical element with a second spacing between the first and second optical elements, which is greater than the first spacing, a third optical effect which is different from the second optical effect is produced.

Upon overlap of the first and second optical elements a spacing-dependent optical effect thus manifests itself, which is dependent on the spacing between the first and second optical elements. In dependence on whether the first and the second elements are brought into overlapping relationship and further in dependence on the spacing between the mutually overlapping first and second optical elements, the optical effect which manifests itself to the viewer is thus different. The invention thus affords the user a novel verification process which goes far beyond merely making clear a concealed security feature. The invention makes it possible for security documents to be provided with particularly conspicuous and surprising security features which are particularly simple for the user to check. In addition the invention affords the possibility of integrating further security features into a security document in a particularly inexpensive fashion: the use of only one transparent and one opaque optical element means that it is possible for the security document to be provided with three or more security features. That makes it possible to produce security documents which are inexpensive to produce and which can only be imitated with difficulty and which can be easily checked by means of the invention.

Advantageous configurations of the invention are set forth in the appendant claims.

In accordance with a preferred embodiment of the invention upon overlap of the second optical element with the first optical element with the first spacing a first pattern is manifested as a second optical effect and upon overlap of the second optical element with the first optical element with the second spacing an enlarged representation of the first pattern manifests itself as a third optical effect. Upon a reduction in the distance between the optical elements a reduction effect thus occurs and upon an increase in the distance a magnification effect occurs. Such an unexpected optical illusion effect is very conspicuous and easy to note.

Particularly impressive effects can be achieved when a diffractive pattern manifests itself to the viewer upon overlap of the first and the second optical elements, which pattern appears small at the first spacing and markedly larger at the second spacing.

In addition it is also possible for a reduced or altered representation of the first pattern to manifest itself at the second spacing.

In accordance with a further preferred embodiment upon a reduction or increase in the spacing disappearance of a specific item of information and/or an information change takes place so that at the first spacing and at the second spacing different items of information present themselves to the viewer. It is further possible that, at a third or fourth spacing between the first and the second optical elements, further different optical effects appear.

Preferably in that respect both the second optical effect and also the third optical effect differ markedly from the first optical effect, thus for example different items of information or markedly different representations in terms of size of an item of information.

In accordance with a preferred embodiment of the invention the opaque second optical element has a first layer structured in accordance with a micropattern. In that respect micropattern means that the pattern involves a high-resolving pattern whose typical size is greater than the resolution capability of the human eye. The first transparent optical element has a transparent layer in which a convex lens of a focal length which approximately corresponds to the second spacing is superposed with a lens raster which is matched to the micropattern and which comprises a plurality of refractive or diffractive microlenses of a focal length which corresponds to the first spacing. If the spacing between the mutually overlapping first and second optical elements corresponds to the first spacing, the items of information which are encoded in the deviation of pattern regions or parts of the pattern regions of the micropattern and the lens rasters appear. If the spacing between the mutually overlapping first and second optical elements corresponds to the second spacing then the micropattern or parts of the micropattern becomes or become visible to the viewer. It is particularly advantageous in terms of that implementation of the invention that the items of information which appear with different spacing of the mutually overlapping first and second optical elements can be substantially mutually independently designed and a relatively abrupt, binary information change can be achieved.

In that case the micropattern is preferably of a typical size of less than 100 μm, preferably 100 to 40 μm. In addition the micropattern is preferably composed of a large number of identical, repeating structure elements. In that case the dimensions of the individual structure elements should be less than 200 μm. Repetitive patterns of that kind permit simplified design and checking of the second and third optical effects which manifest themselves to the viewer.

In addition it is also possible for the structure elements of the micropattern to be arranged in differing surface distribution in the surface region of the second optical element so that the first optical effect which occurs upon direct viewing of the further optical element, is dependent on the surface density of the distribution of the structure elements, in the manner of a grey scale image.

The first layer, structured in accordance with the micropattern, of the second optical element can be a coloured layer or a reflective layer which is structured in accordance with the micropattern. Preferably however a diffractive structure is formed in the first layer in a pattern region which is shaped in accordance with the micropattern so that the first to third optical effects show a diffractive pattern. That makes it possible to achieve a particularly high level of safeguard against forgery.

Preferably the convex lens is formed by a structure which has an optical-diffraction effect and which optically-diffractively produces the effect of a convex lens. The structure is preferably formed by a grating structure which varies continuously over the surface region in respect of its grating frequencies and optionally further grating constants and which is either a binary structure or is of such a nature that in each case the one flanks of the grating grooves extend parallel to each other and approximately parallel to a perpendicular to the main plane of the boundary layer while the angle of the respective other flanks of the grating surface changes substantially continuously with respect to a perpendicular to the main plane of the boundary layer over the surface region. In that case the grating depth of the lens structure is preferably less than 10 μm. The use of such a ‘diffractive lens’ has the advantage over the use of a ‘refractive lens’, for example a Fresnel magnification lens, that the necessary depth of structure is considerably reduced and thus convex lens of correspondingly large area can be integrated in the security document. It is also possible in that respect for the microlenses of the lens raster to be embodied in the form of ‘diffractive lenses’.

The superpositioning of the convex lens and the lens raster is preferably implemented by the second optical element being divided into a plurality of adjacent first and second regions. One or more microlenses of the microlens raster is or are shaped in each of the first regions while structures which form the convex lens are shaped in the second regions. The width and/or the length of the first and second regions in that case is respectively below the resolution capability of the human eye. That kind of superpositioning of the convex lens and the lens raster ensures a high level of efficiency and luminous intensity for the lens raster as well as the convex lens.

It is further also possible for a raster of the structures forming the convex lens and the lens raster to be shaped into a transparent layer of the first optical element.

In accordance with a further preferred embodiment of the invention the second optical element has a microstructured moiré pattern. The associated first optical element has an at least partially transparent layer in which a moiré analyser which is matched to the moiré pattern and a convex lens are superposed, which lens is of a focal length which corresponds to the second spacing and is suitable for making the microstructuring of the moiré pattern visible. If the spacing between the mutually overlapping first and second optical elements is very small, a moiré image is generated by superpositioning of the moiré image and moiré analyser. If the spacing between the mutually overlapping first and second optical elements is increased towards the second spacing the moiré image is no longer generated and a magnification of the microstructuring of the moiré pattern is presented to the viewer. At a first spacing between the first and second optical elements the moiré image thus appears while with a second spacing between the first and second optical elements an enlarged representation of the microstructuring of the moiré pattern appears.

With such a raster of a macroscopic lens with a microlens raster the macroscopic lens is for example of a diameter of 3 mm to 50 mm, preferably 10 mm to 30 mm. The focal length of the macroscopic lens is preferably between half the diameter and ten times the diameter, in particular between one diameter and five times the diameter. The microlens raster (for example quadratically or hexagonally densest packing) has a plurality of microlenses in the region of 5 μm to 500 μm, preferably 50 μm to 200 μm. The focal length of the microlenses is between half the diameter and a hundred times the diameter, preferably between one diameter and ten times the diameter.

This embodiment of the invention also has the advantage that the items of information which are represented as the second and the third optical effect can be designed independently of each other and an abrupt binary change in the items of information shown can be implemented upon an increase/reduction in the spacing. That means that particularly impressive security features can be implemented in the security document.

In accordance with a further preferred embodiment of the invention the second optical element has a concave mirror element and the first optical element has a convex lens. Upon a reduction in the spacing between the concave mirror element and the convex lens the magnification power of the system is reduced so that the reflected image appears smaller. If the spacing between the concave mirror element and the convex lens is increased the magnification power of the system is increased and the reflected image appears larger. Accordingly the reduction effect which has already been referred to above is achieved upon a reduction in the spacing.

The image reduction/magnification effect with the variation in the spacing is unexpected from the point of view of the observer as he intuitively expects the opposite. As a result it is easy for the people involved to note the visual effect and to communicate it. Furthermore it is very difficult to simulate such optical effects with commercially available technology so that a high degree of safeguard against forgery is achieved.

Preferably the second optical element has a replication lacquer layer and a reflective layer adjoining the replication lacquer layer, wherein shaped into the interface between the replication lacquer layer and the reflective layer is a diffractive relief structure which by optical-diffraction means produces the effect of a concave mirror element. The use of such a 'diffractive' concave mirror element achieves the advantages already referred to hereinbefore in relation to the use of a 'diffractive lens'.

It is possible for the second optical element to only reflect the mirror image of the viewer, which, upon viewing through the superposed first optical element, experiences the optical changes already referred to herein before.

Particular advantages are achieved if the relief structure which is shaped into the interface between the replication lacquer layer and the reflective layer is a superpositioning of a structure which by optical-diffraction means produces the effect of a concave mirror element and a diffractive structure which produces an optical pattern. Thus it is possible for example for a hologram or KINEGRAM®, upon being viewed through the first optical element, to be subjected to the optical changes referred to hereinbefore, that is to say the size of the hologram decreases with a reduction in spacing and increases with an increase in spacing. An effect of that kind can be simulated only with very great difficulty when using commercially available technologies.

BRIEF DESCRIPTION OF THE DRAWINGS

The invention is described by way of example hereinafter by means of a number of embodiments with reference to the accompanying drawings in which:

FIG. 1 shows a security document 1 in various viewing situations 41, 42 and 43.

DETAILED DESCRIPTION OF THE INVENTION

Figure 1:
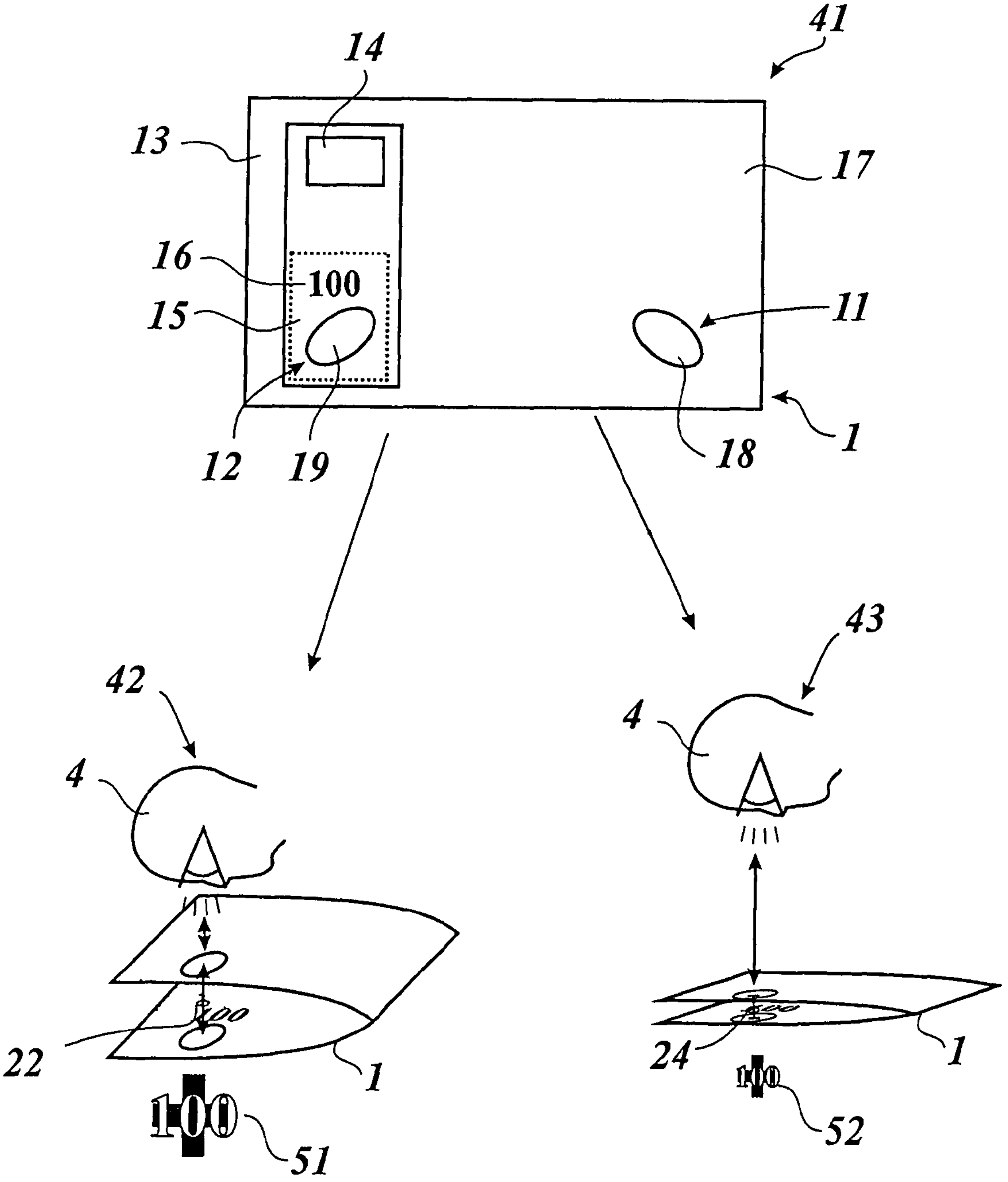
FIG. 1 shows a diagrammatic view of various viewing situations of a security document according to the invention.

The security document 1 is a value-bearing document, for example a banknote or a cheque. In addition it is also possible for the security document 1 to form an identification document, for example an identity card.

The security document 1 comprises a flexible carrier 17 on which a transparent optical element 18 is arranged in a region 11 and an opaque optical element 19 is arranged in a region 12. The carrier 17 is preferably a carrier of paper material which is provided with printing thereon and in which further security features, for example watermarks or security threads, are provided.

It is however also possible for the carrier 17 to be a plastic film or a laminate comprising one or more paper and plastic material layers.

An opening in window form is produced in the carrier 17 in the region 11, for example by stamping, which is then closed again by application of the transparent optical element 18. In that way the security document 1 has a transparent window with the transparent optical element 18 in the region 11.

It is however also possible that the material used for the carrier 17 is already a transparent or partially transparent material and thus the carrier can remain in the region 11. That is the case for example if the carrier 17 comprises a transparent plastic film which is no longer provided with a clouding layer in the region 11. Furthermore it is also possible for the transparent window to be already produced in the paper production procedure and for the transparent optical element 18 to be introduced into the carrier 17 in the manner of a security thread.

As shown in FIG. 1 a patch 13 is applied to the carrier 17, on which the opaque optical element 19 is arranged, on the side of the security document 1 which is opposite to the region 11. The patch 13 is preferably a transfer layer of a transfer film, for example a hot stamping film, which is joined to the carrier 17 under the effect of pressure and heat by means of an adhesive layer. As shown in FIG. 1, besides the optical element 12, the patch 13 can also have one or more further optical elements 14 and 16 which, as in the region 15, can form a combination representation with the optical element 19. The optical elements 14 and 16 are for example diffraction gratings, holograms, KINEGRAMS® or indica produced with effect pigments.

Furthermore it is also possible for the transparent optical element 18 and the opaque optical element 19 to be arranged on two different sheets of a security document, for example a passport, the sheets being joined together for example by adhesive or stitching.

The detailed structure of the optical element 18 will now be described with reference to FIG. 2, FIG. 4*a*, FIG. 4*b* and FIG. 4*c*.

Figure 2:
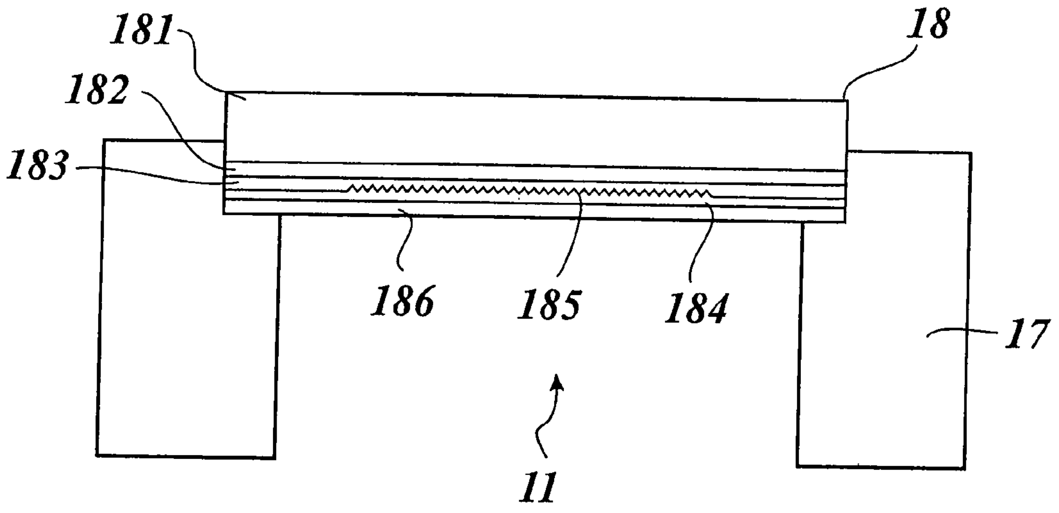
FIG. 2 shows a sectional view of a transparent optical element for a security document according to the invention as shown in FIG. 1.

FIG. 2 shows the carrier 17 which comprises a paper material of a thickness of about 100 μm and which in the region 11 has an opening produced by means of a stamping or cutting operation. The optical element 18 is preferably applied to the paper material of the carrier 17 under heat and pressure, by an adhesive layer of the optical element 18 being activated by the heat and pressure. The depression shown in FIG. 2 is produced at the same time in the region of the optical element 18 by the pressure applied.

The optical element 18 comprises a carrier film 181, a bonding layer 182, a replication lacquer layer 183, an optical separation layer 184 and an adhesive layer 186.

The carrier film 181 comprises for example a PET or BOPP film of a layer thickness of 10 to 50 μm. The function of the carrier film is to provide for the necessary stability for bridging over the opening. The bonding layer 182 is of a thickness of 0.2 to 2 μm and is applied to the carrier film by means of a printing process. The replication lacquer layer 183 comprises a thermoplastic or crosslinked polymer in which a relief structure 185 is replicated by means of a replicating tool under the effect of heat and pressure or by UV replication. The optical separation layer 184 is of a sufficiently large difference in terms of refractive index (for example 0.2) with respect to the replication lacquer layer 183 and is substantially planar on the surface opposite the relief structure, as indicated in FIG. 2.

In this case it is also possible to dispense with the optical separation layer 184. Furthermore it is also possible to dispense with the adhesive layer 186 in the region of the relief structure 185 so that the relief structure 185 is directly in contact with the air.

The relief structure 185 is preferably not a relief structure which forms a refractive lens but a diffractive relief structure which by optical-diffraction means produces the effect of a convex lens. Diffractive relief structures which can be used for that purpose comprise grating structures which are continuously changed in terms of their grating frequency and optionally further grating constants over the surface region, as are shown for example in FIGS. 4*a* and 4*b*.

Figure 4A:
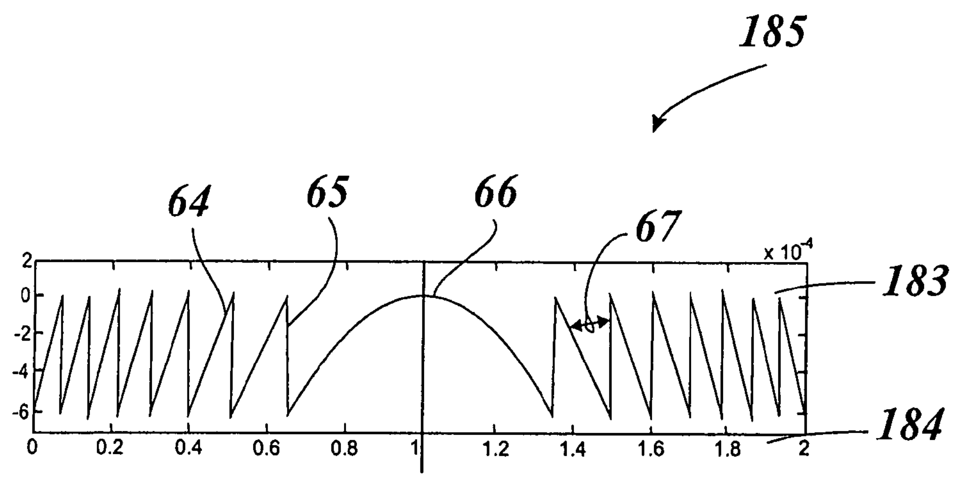
FIG. 4*c* shows a plan view of a relief structure for the optical element shown in FIG. 2.

FIG. 4*a* shows the relief structure 185 which is formed between the replication lacquer layer 183 and the optical separation layer 184 and in which a respective flank 65 of the grating grooves extend in mutually parallel relationship while the angle 67 of the other flank 64 substantially continuously changes with respect to a perpendicular main plane of the separation layer over the surface region. Arranged at the centre of the lens is a paraboloidal portion 66 from which both the grating frequency and also the angle 67 of the flank 64 continuously change, as shown in FIG. 4*c*.

Figure 4B:
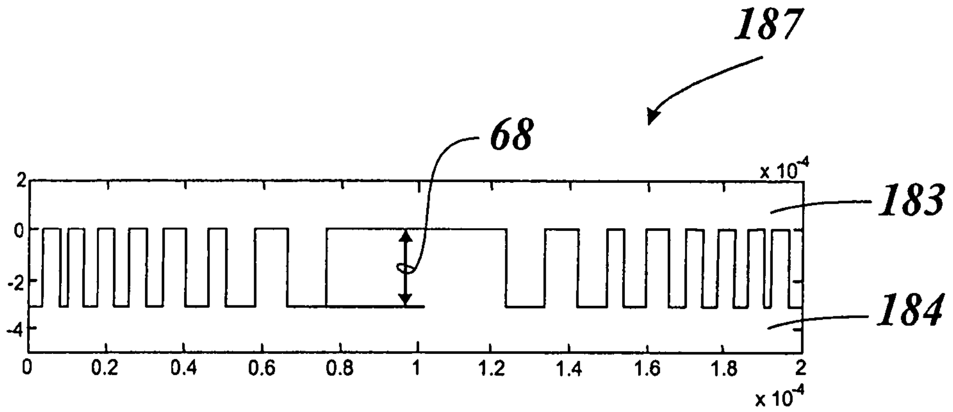
Figure 4C:
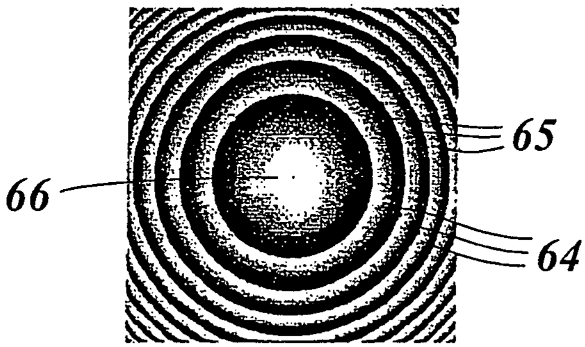

FIG. 4*b* shows a binary relief structure 187 which is formed between the replication lacquer layer 183 and the optical separation layer 184 and which also by optical-diffraction means produces the effect of a convex lens. The advantage of using a binary relief structure of that kind in comparison with the relief structure shown in FIG. 4*a* or a sinusoidal relief structure is in that respect that the profile depth 68 necessary to produce the lens effect can be reduced.

The values of the relief depth which are specified in FIGS. 4*a* and 4*b* involve the phase difference in radians, from which the geometrical depth of the relief structure can be calculated in known manner in dependence on the wavelength of the light used (for example 500 nm for the maximum sensitivity of the human eye). The diameter of the lens structure is generally between 0.5 and 300 mm, wherein the focal length of the lenses is usually between the value of the lens diameter and five times that value.

The precise structure of the optical element 19 will now be described with reference to FIG. 3.

Figure 3:
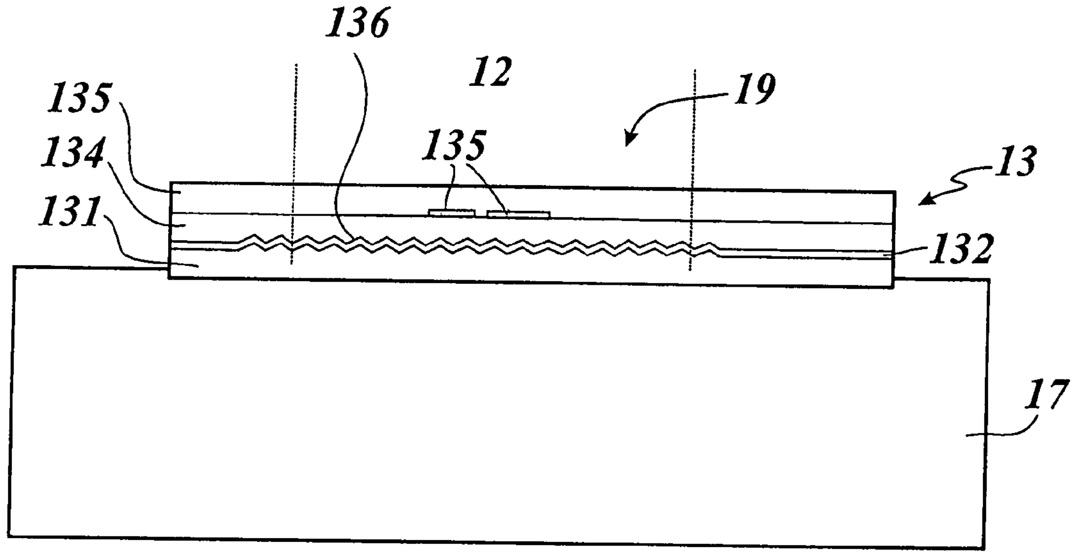
FIG. 3 shows a sectional view of an opaque optical element for a security document according to the invention as shown in FIG. 1, FIG. 4*a* a shows a diagrammatic view of a relief structure for the optical element of FIG. 2, FIG. 4*b* a shows a diagrammatic view of a further relief structure for the optical element of FIG. 2.

FIG. 3 shows the carrier 17 and the patch 13 which forms the optical element 19 in the region 12. In this case the patch 13 has an adhesive layer 131, a reflection layer 132, a replication lacquer layer 134, a decorative layer 135 which is shaped in a pattern form and a protective lacquer layer 135. A relief structure 136 is shaped into the interface between the replication lacquer layer 134 and the reflective layer 131 in the region 12.

The reflection layer 132 is preferably a thin vapour-deposited metal layer or an HRI layer (HRI=high refraction index). By way of example $TiO_2$, ZnS or $Nb_2O_5$ are considered as materials for an HRI layer. The material for the metal layer considered is substantially chromium, aluminium, copper, iron, nickel, silver, gold or an alloy with those materials. Reflectivity could also be achieved with an encapsulated system (two suitable materials with a sufficiently large difference in refractive index) in relation to air. Furthermore, instead of such a metallic or dielectric reflection layer, it is possible to use a thin film layer array with a plurality of dielectric or dielectric and metallic layers.

The relief structure 136 between the replication lacquer layer 134 and the reflective layer 132 forms a concave mirror element. Preferably in this case the relief structure 136 does not involve a macrostructure forming a refractive concave mirror element but a diffractive relief structure which by optical-diffraction means produces the effect of a concave mirror element. With regard to the relief structures which can be used for that purpose attention is directed to the description relating to FIGS. 4*a* to 4*c*, wherein the relief structures which can be employed for that purpose are shaped in mirror symmetrical relationship with respect to the relief structures described with reference to FIGS. 4*a* to 4*c*, wherein the grating frequency continuously increases starting from the centre of the concave mirror element, but the curvature is of an opposite sign.

In the present embodiment the relief structure 136 is formed by a relief structure which is formed from an additive superpositioning of a structure which produces the effect of a concave mirror element similarly to the relief structures 185 and 187 and a further diffractive structure producing an optical pattern. That diffractive structure is for example a hologram in the form of a Swiss cross.

The decorative layer 135 is preferably structured in a pattern form in accordance with a micropattern which is just below the resolution capability of the human eye. In the embodiment being considered here the decorative layer 135 is structured in the form of the number '100'. It is advantageous in that respect for the micropattern to be a repetitive micropattern which is composed of a plurality of similar structure elements. For example each of those structure elements is formed by a representation of the number '100'. In that respect it is also possible for the surface density of the structure elements to be varied in the form of a grey scale image and thus to include a further item of image information which is directly perceptible to the human eye.

The decorative layer is preferably on a printing which is applied by means of a printing process and can comprise a transparent coloured layer or a layer which contains interference layer pigments or cholesteric liquid crystal pigments and which produces an optically variable colour impression. It is also possible for the decorative layer used to be a thin film layer system for producing viewing angle-dependent colour shifts by means of interference, in which case the decorative layer is preferably arranged between the replication lacquer layer 134 and the reflection layer 132. A further option involves not applying the reflection layer 132 to the replication lacquer layer 134 throughout but structuring it in a pattern form, preferably structuring it in a pattern form in accordance with a micropattern as described hereinbefore. After application of the reflection layer 132 over the full surface area involved, the reflection layer 132 is for that purpose partially demetallised by positive/negative etching or partially removed by means of laser ablation.

The configuring of the security document 1 effected as described hereinbefore provides that the security document 1 affords the following optical effects in the viewing situations 41, 42 and 43: at a spacing 24 between the mutually overlapping optical elements 18 and 19 an optical effect 52 appears in the form of a holographic representation of a Swiss cross against the background as a representation of the number '100'. With a larger spacing 22 between the mutually overlapping optical elements 18 and 19 an optical effect 51 appears in the form of a representation of the number '100', which is markedly enlarged in relation to the optical effect 52, against the holographic representation of the Swiss cross. If the optical elements 18 and 19 are not in overlapping relationship the optical effect which appears is a grey scale image which is encoded into the structuring of the decorative layer 135.

Figure 5:
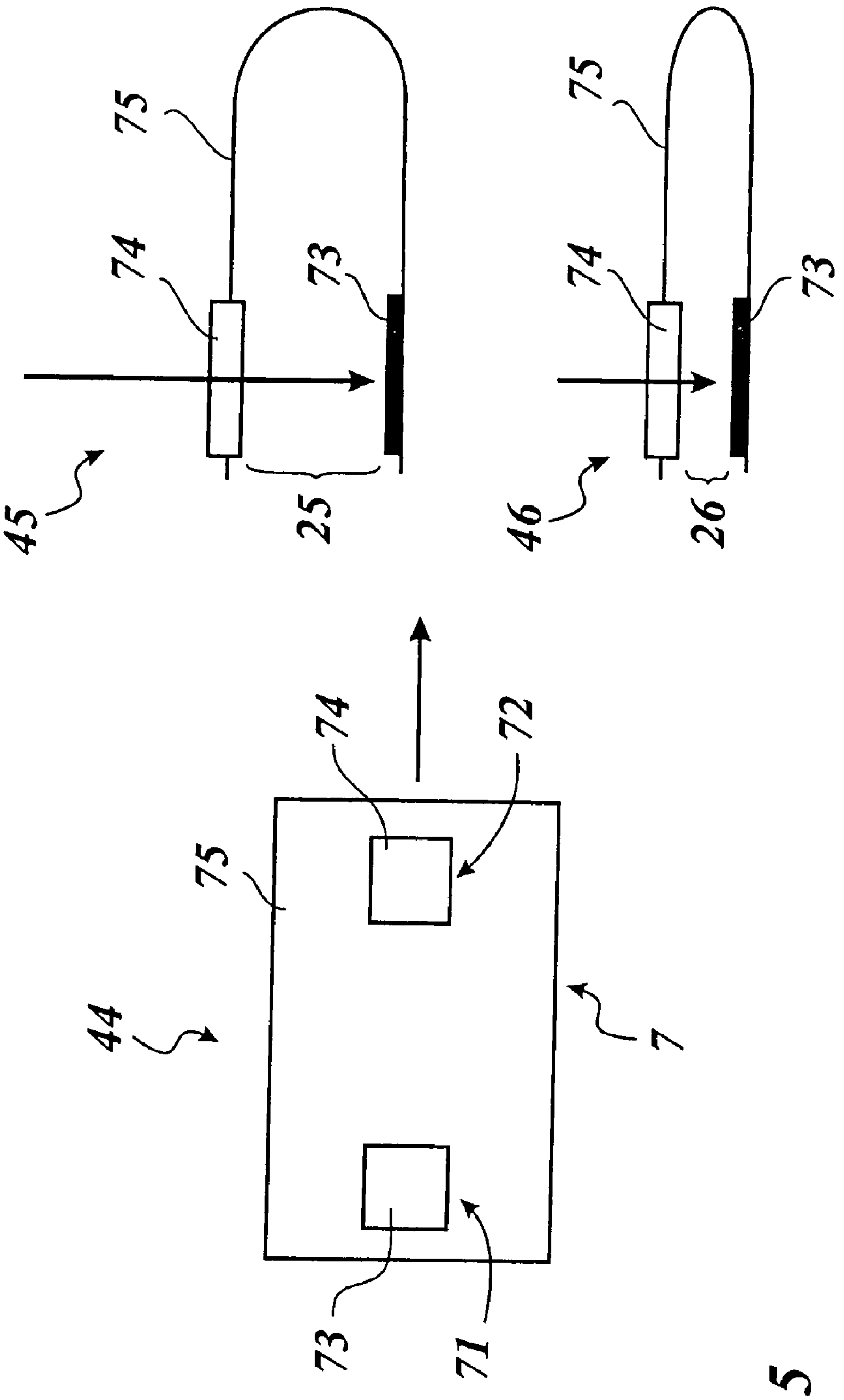
FIG. 5 shows a diagrammatic view of various viewing situations of a security document according to the invention for a further embodiment of the invention.

Reference is now made to FIG. 5 to describe a further embodiment of the invention.

FIG. 5 shows a security document 7 which has an opaque optical element 73 in a region 71 and a transparent optical element 74 in a region 72. In this case the optical elements 73 and 74 are applied to a carrier 75. In a viewing situation 44 the optical elements 73 and 74 are not in overlapping relationship, in a viewing situation 45 the optical elements 73 and 74 are in overlapping relationship at a spacing 25 and in a viewing situation 46 they are spaced at a smaller spacing 26.

Figure 6:
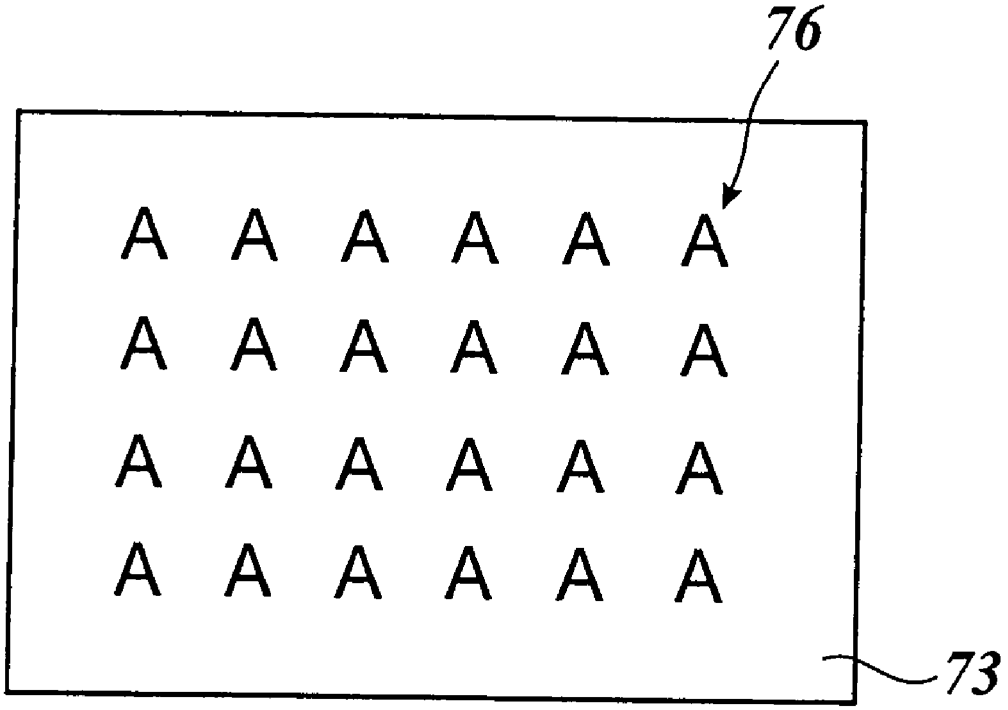
FIG. 6 shows a plan view of an opaque optical element for the security document of FIG. 5, and FIGS. 7*a* to 7*c* show diagrammatic views to clearly illustrate a transparent optical element for the security document of FIG. 5.

The optical element 73 has a layer structured in accordance with a micropattern and thus for example comprises a protective lacquer layer, a decorative layer structured in accordance with the micropattern and an adhesive layer. The decorative layer comprises for example a coloured layer, an effect pigment layer or a reflecting layer which is structured by suitable patterned printing thereon, by positive/negative etching or by ablation, in the form of the micropattern. Thus for example FIG. 6 shows a plan view on an enlarged scale on to the optical element 73 which exhibits a micropattern formed by a plurality of similar repetitive structure elements 76 in the form of the letter 'A'. As already described hereinbefore it is possible for the structure elements 76 to be arranged on the optical element 73 in a differing surface density so that an item of further information which is directly perceptible to the human eye is encoded into the micropattern in the manner of a grey scale image. Micrographics, microimages or entire microtext passages can also be used as the structure element. In addition it is also possible for the micropattern to be composed of mutually differing structure elements.

Furthermore it is also possible for the optical element 73 to be made up like the optical element 19 as shown in FIG. 3, with the difference that the diffractive structure 136 is not involved with the additive superpositioning of a structure which by optical-diffraction means produces a concave mirror element. The diffractive structure which is formed in the optical element 73 between the replication lacquer layer and the reflection layer is preferably a hologram which forms a background representation and which is also visible in the viewing situation 44. In accordance with a further preferred embodiment the diffractive structure, for example a black mirror structure, is provided in pattern regions which are shaped in accordance with a micropattern, for example in the surface regions which are covered by the structure element 76. In that case a second, differently diffractive structure, for example a matt structure, can be provided in the background region.

The optical element 74 is designed like the optical element 18 shown in FIGS. 1, 2 and 4*a* to 4*c*, with the difference that the relief structure 185 corresponds to a raster with a convex lens of a focal length which corresponds to the spacing 25, with a lens raster which is matched to the micropattern of the optical element 73 and which has a plurality of microlenses of a focal length which corresponds to the spacing 26.

Thus the relief structure 185 has for example a 60 μm/60 μm raster of a macroscopic lens with a microlens raster. The macroscopic lens is of a diameter in the range of 3 mm to 50 mm, preferably 10 mm to 30 mm. The focal length of the lens is between half the diameter and ten times the diameter, preferably between one times the diameter and five times the diameter. For example the macroscopic lens is thus of a diameter of 25 mm and involves a focal length of 75 mm. The microlens raster comprises microlenses of a diameter in the range of 5 μm to 500 μm, preferably between 50 μm and 200 μm. The focal length of the microlenses is between half the diameter and one hundred times the diameter, preferably between one times the diameter and ten times the diameter. By way of example the diameter of the microlenses is 150 μm with a 1 mm focal length.

Figure 7A:
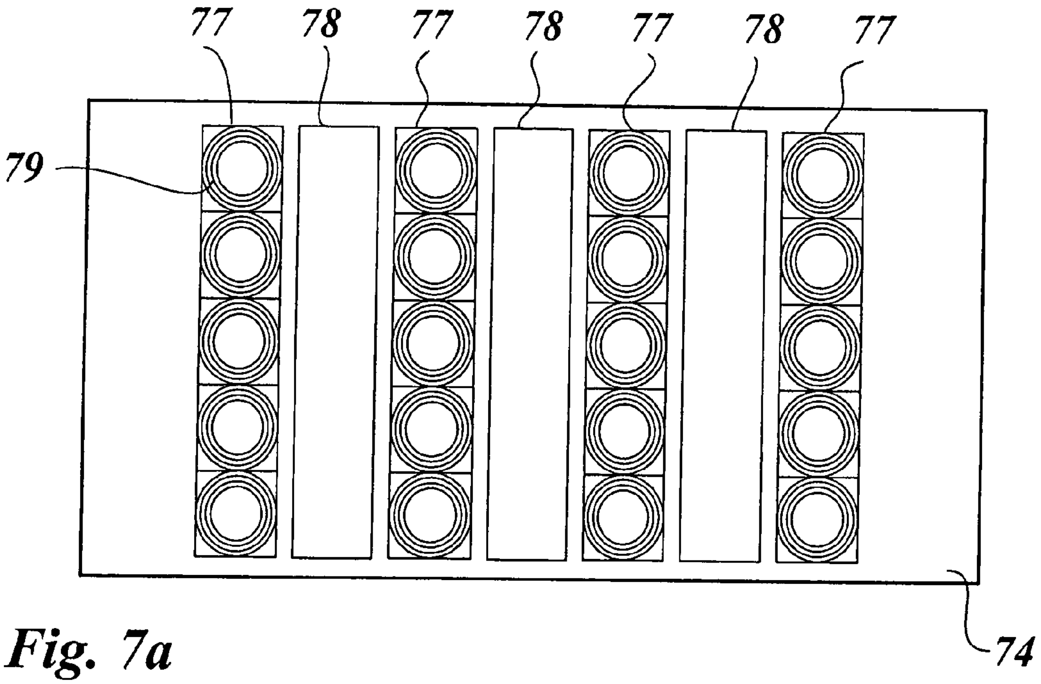
Figure 7B:
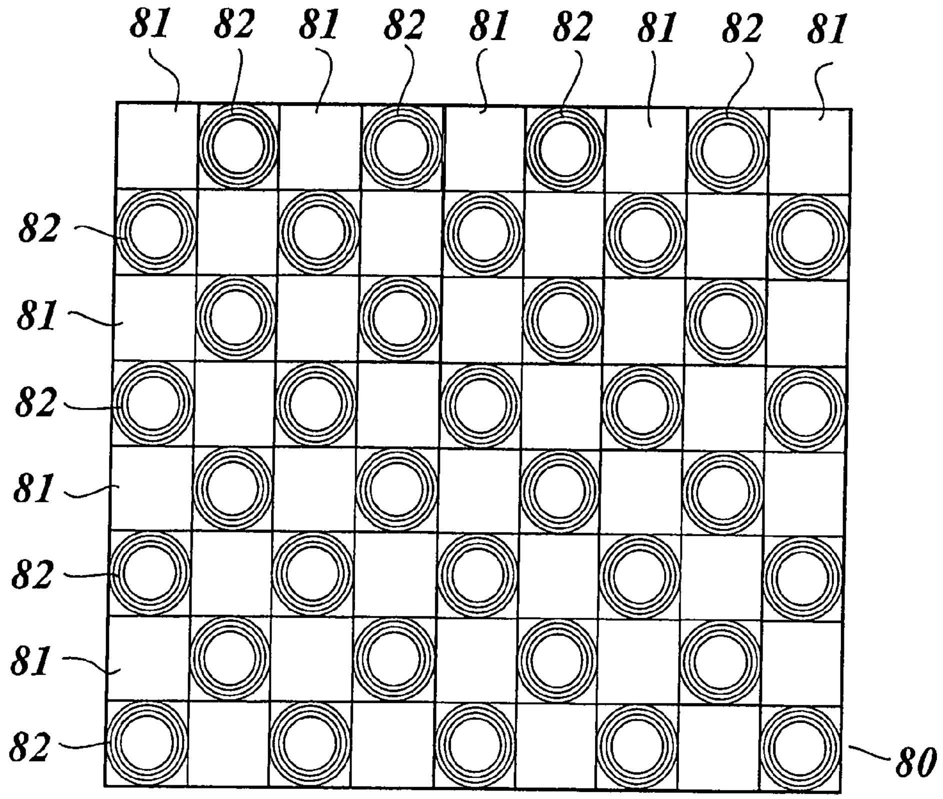
Figure 7C:
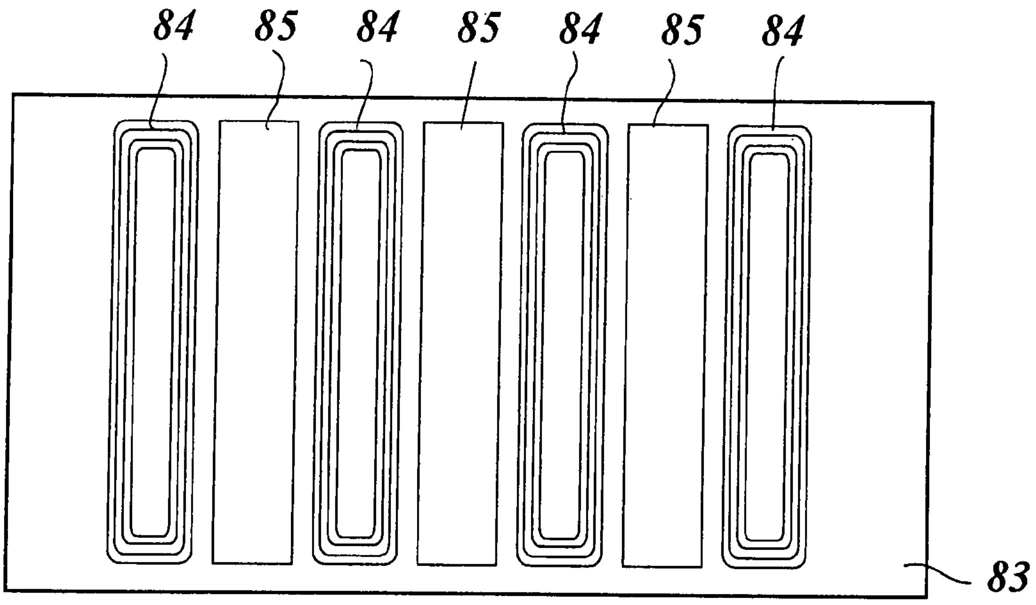

FIGS. 7*a* to 7*c* show a number of embodiments of such a superpositioning of a convex lens and a microlens raster.

As shown in FIG. 7*a* the surface region of the optical element 74 is divided into first regions 77 and second regions 78 which are respectively arranged in mutually adjoining relationship. In this case the width of the first and second regions 77 and 78 is below the resolution capability of the human eye so that the spacing between two first or two second regions is for example <200 μm.

The microlenses of the microlens raster are arranged in the regions 77. In this case the microlenses are preferably in the form of refractive lenses but it is also possible for those lenses to be in the form of 'diffractive' lenses similarly to the embodiments shown in FIGS. 4*a* to 4*c*. In addition a diffractive relief structure forming a convex lens, as shown in FIGS. 4*a* to 4*c*, is arranged on the surface region of the optical element 73, distributed over the surface regions 78.

First regions 81 and second regions 82 are arranged in alternately mutually juxtaposed relationship in a surface region 80 as shown in FIG. 7*b*, wherein here also the spacing between two first regions 81 and two second regions 82 is below the resolution capability of the human eye.

In a surface region 83 as shown in FIG. 7*c* first surface regions 84 and second surface regions 85 are arranged in adjacent mutually juxtaposed relationship, in which case only a single convex lens of the lens raster is arranged in each of the first surface regions 84, that lens then preferably being in the form of a 'diffractive' lens.

Thus the following optical effects appear to the viewer in the viewing situations 44 to 46:

In the viewing situation 45 the viewer is presented with an optical effect in the form of an enlarged representation of one or more structure elements 76. In the viewing situation 46 the viewer observes an item of information which is encoded in the relative position of the micropattern or parts of the micropattern relative to the lens raster. Within the viewing situation 44 the optical effect which appears is the grey scale image which is coded into the configuration of the micropattern of the optical element 73 or a hologram or another optically-diffractively generated pattern, for example a KINEGRAM® which arises out of the superpositioning of the optical effects produced by the diffractive structures shaped in the pattern regions.

In addition it is also possible that structures of a moiré analyser are arranged in place of a microlens raster in the regions 77, 81 and 84 as shown in FIGS. 7*a* to 7*c* of the optical element 74 and a moiré pattern is arranged instead of the micropattern of FIG. 6 in the optical element 73.

In that respect the term moiré pattern is used to denote a pattern which is formed from repetitive structures and which upon superpositioning with or in viewing through a further pattern formed by repetitive structures which acts as a moiré analyser exhibits a new pattern, namely a moiré image which is concealed in the moiré pattern. In the simplest case that moiré effect arises out of the superpositioning of dark and light stripes which are arranged in accordance with a line raster, wherein that line raster is phase-shifted in region-wise manner to produce the moiré image. Besides a linear line raster it is also possible for the lines of the line raster to have curved regions and to be arranged for example in a wave-shaped or circular configuration. In addition it is also possible to use a moiré pattern which is built up on two or more line rasters which are turned relative to each other or which are in superposed relationship. Decoding of the moiré image in a line raster of that kind is also effected by region-wise phase displacement of the line raster, in which case two or more different moiré images can be encoded in a moiré pattern of that kind. Furthermore it is also possible to use moiré patterns and moiré analysers which are based on the so-called ‘Scrambled Indica®-Technology’ or on a hole pattern (round, oval or angular holes of various configurations).

The moiré analyser arranged in the regions 77, 82 and 84 thus comprises for example an opaque stripe pattern. The moiré pattern provided in the optical element 74 can be implemented in the manner described with reference to the micropattern shown in FIG. 6 in the form of a structured decorative layer or in a diffractive structure which is shaped in pattern regions. In that case the moiré pattern is sub-structured, that sub-structuring preferably being effected in the form of a microtext or repetitive microimages.

When the optical elements 74 and 73 are disposed one over the other in mutually overlapping relationship, that is to say when the spacing between the optical elements 73 and 74 is very small, the moiré image generated by the superpositioning of the moiré pattern and the moiré analyser appears. When the spacing is increased the enlarged representation of the microstructuring of the micropattern, that is to say for example an enlarged and thus readable representation of a microtext, appears to the viewer. When the optical elements 73 and 74 are not in overlapping relationship the optical effects already described hereinbefore in relation to the viewing situation 44 occur.

The invention claimed is:

1. A security document having a first transparent region in which a first transparent optical element is arranged and a second region in which a second opaque optical element is arranged, which has a first optical effect, wherein the first region and the second region are arranged on a carrier of the security document in mutually spaced relationship in such a way that the first and second regions can be brought into overlap with each other, wherein the first optical element and the second optical element are of such a configuration and are so matched to each other that upon overlap of the second optical element with the first optical element at a first spacing between the first and the second optical element, a second optical effect is produced and upon overlap of the second optical element with the first optical element at a second spacing between the first and second optical elements, which is greater than the first spacing, a third optical effect which is different from the second optical effect is produced, wherein the second optical element has a microstructured moiré pattern with a moiré image concealed within the first optical effect, and the first optical element has an at least partially transparent layer in which there are superposed a moiré analyzer, which is matched to the microstructured moiré pattern, and a convex lens which is of a focal length which corresponds to the second spacing, said moiré image being revealed by the moiré analyzer in the second optical effect when the first and second optical elements are at the first spacing, and a magnification of the microstructuring of the moiré pattern being made visible by the convex lens in the third optical effect when the first and second optical elements are at the second spacing, said moiré image being no longer visible in the third optical effect, and wherein the first optical element is divided into a plurality of adjacent first and second regions, wherein the width and/or the length of the first and second regions is <200 μm, the first regions having structure forming the moiré analyzer and shaped in the second regions are structures forming the convex lens.

2. A security document according to claim 1, wherein the microstructuring magnified by the convex lens shows an enlarged representation of the moire image generated by the superpositioning of the moiré pattern and the moiré analyzer.

3. A security document according to claim 1, wherein the second optical element has a replication lacquer layer and a reflective layer adjoining the replication lacquer layer and a diffractive relief structure which by upon direct viewing shows the first optical effect is shaped into the interface between the replication lacquer layer and the reflective layer.

4. A security document according to claim 1, wherein the second optical element comprises the transfer layer of a transfer film.

5. A security document according to claim 1, wherein, upon overlap of the second optical element with the first optical element at the first spacing, a first pattern appears as a second optical effect and upon overlap of the second optical element with the first optical element at the second spacing, an enlarged representation of the first pattern appears as the third optical effect.

6. A security document according to claim 5, wherein the first pattern is a diffractive pattern.

7. A security document according to claim 5, wherein the microstructured moiré pattern is of a typical size of less than 200 μm.

8. A security document according to claim 5, wherein the microstructured moiré pattern is a pattern formed from a plurality of identical repetitive structure elements, in which the dimensions of the individual structure elements are <200 μm.

9. A security document according to claim 5, wherein the convex lens is formed by a diffractive structure which by optical diffraction means produces the effect of a convex lens.

10. A security document according to claim 5, wherein a diffractive structure is shaped in a first layer in a pattern region which is formed in accordance with the microstructured moiré pattern.

11. A security document according to claim 10, wherein the first layer is a coloured layer or a reflective layer which is structured in accordance with the microstructured moiré pattern.

12. A security document comprising:

a flexible carrier having a first portion and a second portion;

an opaque microstructured moiré pattern disposed on said first portion of said flexible carrier, said microstructured moiré pattern having a moiré image concealed therein; and a transparent optical element disposed on said second portion of said flexible carrier, said transparent optical element being divided into a plurality of mutually adjoining juxtaposed first and second regions, said first and second regions having a width and/or a length <200 μm, the first regions having structure forming a moiré analyzer and shaped in the second regions are structures forming a convex lens, said moiré analyzer matching said microstructured moiré pattern and said convex lens having a focal length, wherein said transparent optical element is positionable over said microstructured moiré pattern at a first spaced distance therebetween whereby said moiré image is revealed by said moiré analyzer, and wherein said transparent optical element is positionable over said microstructured moiré pattern at a second spaced distance therebetween, said second spaced distance being greater than said first spaced distance and being substantially equal to the focal length of said convex lens, whereby said moiré image is no longer visible when said transparent optical element is positioned over said microstructured moiré pattern at said second spaced distance, but instead a magnification of said microstructured moiré pattern is made visible by said convex lens.

* * * * *